(12) United States Patent  
Kawamukai et al.

(10) Patent No.: US 7,200,814 B2  
(45) Date of Patent: Apr. 3, 2007

(54) REPRODUCTION APPARATUS

(75) Inventors: Hitoshi Kawamukai, Ehime-ken (JP); Yoshiho Gotoh, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 449 days.

(21) Appl. No.: 09/829,361

(22) Filed: Apr. 9, 2001

(65) Prior Publication Data

US 2001/0013876 A1 Aug. 16, 2001

Related U.S. Application Data

(62) Division of application No. 09/085,602, filed on May 27, 1998, now Pat. No. 6,243,086.

(30) Foreign Application Priority Data

May 29, 1997 (JP) .................................. 9-139486  
May 30, 1997 (JP) .................................. 9-141929

(51) Int. Cl.  
*G11B 27/00* (2006.01)

(52) U.S. Cl. ...................... 715/723; 715/719; 715/721

(58) Field of Classification Search ........ 345/716–723, 345/708; 386/124–125, 95, 92; 725/32, 725/86, 37–44, 93, 98, 90, 14, 136, 61; 715/708, 715/716–726  
See application file for complete search history.

(56) References Cited

U.S. PATENT DOCUMENTS

| | | | |
|---|---|---|---|
| 5,640,195 A | 6/1997 | Chida | 348/14.01 |
| 5,699,106 A | 12/1997 | Matsubara et al. | 725/54 |
| 5,832,175 A | 11/1998 | Hirayama et al. | 386/92 |
| 5,854,873 A * | 12/1998 | Mori et al. | 386/92 |
| 5,907,659 A | 5/1999 | Yamauchi et al. | 386/125 |
| 5,963,704 A | 10/1999 | Mimura et al. | 386/95 |
| 6,067,400 A * | 5/2000 | Saeki et al. | 386/95 |
| 2003/0123855 A1* | 7/2003 | Okada et al. | 386/98 |

FOREIGN PATENT DOCUMENTS

JP 2718834 11/1997

* cited by examiner

*Primary Examiner*—Tadesse Hailu  
(74) *Attorney, Agent, or Firm*—Renner, Otto, Boisselle & Sklar, LLP

(57) ABSTRACT

There is provided a reproduction apparatus for reproducing stream data recorded on a recording medium, the stream data containing menu item coordinate information representing a display location of a menu item and image information representing an image. The reproduction apparatus includes: a reading section for reading the stream data from the recording medium; an extraction section for extracting the menu item coordinate information contained in the stream data; a reproduction section for reproducing the image information contained in the stream data; a determination section for determining whether or not the menu item has been selected by comparing the extracted menu item coordinate information against a user input in the form of coordinate information; and an execution section for executing a process corresponding to the menu item if the menu item is determined to have been selected.

1 Claim, 8 Drawing Sheets

A reproduction example in the multi-image mode
(Number of angles:4)

REPRODUCTION APPARATUS

This is a division of application Ser. No. 09/085,602, filed May 27, 1998 now U.S. Pat. No. 6,243,086.

BACKGROUND OF THE INVENTION

1. Field of the Invention

The present invention relates to a reproduction apparatus for selectively outputting an image signal from a recording medium on which digital data representing image information is recorded.

2. Description of the Related Art

Due to recent development in technologies, optical disks having an information capacity eight times that of a video CD have been developed, and consequently optical disk reproduction apparatuses are attracting attention as new AV (audio-visual) apparatuses. As a result, studies have been conducted on applications of optical disks for allowing a user to select a predetermined image, out of multiple hours of image information, in an interactive manner.

Hereinafter, a method for selecting a predetermined image from a plurality of images by using a menu will be described.

FIG. 5 schematically illustrates an exemplary conventional optical disk reproduction system. The optical disk reproduction system includes an optical disk reproduction apparatus 51 and a display 52 such as a television set.

The optical disk reproduction apparatus 51 is controlled by means of a remote controller 53. The optical disk reproduction apparatus 51 reproduces image information recorded on an optical disk (not shown) and the display 52 displays the reproduced image information.

Menu information for allowing the selection of one of a plurality of items is recorded on the optical disk. As the optical disk reproduction apparatus 51 reproduces the menu information, a menu is displayed on the display 52. The user selects one of the items contained in the menu by using the remote controller 53. For example, in the case where the menu exhibits a set of numbers correspondingly indicating the respective items, the user may press a key on the remote controller 53 that has the same number as the number of one of the indicated items to select the desired item from among the plurality of items in the menu. Alternatively, the user may press up/down/right/left keys on the remote controller 53 to cause a corresponding movement of a highlighted region which is displayed over the menu, and then press a decision key on the remote controller 53 to select the highlighted item from the items in the menu.

Next, a method for selecting one of a plurality of so-called "angles" (e.g., images respectively corresponding to different perspectives of the same scene or images respectively corresponding to different scenes) will be described. Such a plurality of "angles" are interleaved on the optical disk on which they are recorded, with different numbers being assigned to different "angles". When the optical disk reproduction apparatus 51 reproduces the data which is recorded in this manner, the motion pictures from only one "angle" are reproduced. During the reproduction of the motion pictures from that "angle", the user can press a number key on the remote controller to select another "angle" corresponding to that number, whereby the motion pictures from that "angle" will begin to be reproduced.

However, the above-described prior technique of selecting one of a plurality of items contained in a menu by pressing a number key of a remote controller is not very interactive. Similarly, the above-described prior technique of selecting one of a plurality of "angles" during the reproduction of the motion pictures from only one "angle" is not very interactive because the user needs to know in advance when it is possible to select from a plurality of "angles", i.e., when such "angles" are available. Therefore, a function for allowing an effective selection of menu items or "angles" is desired.

SUMMARY OF THE INVENTION

According to the present invention, there is provided a reproduction apparatus for reproducing stream data recorded on a recording medium, the stream data containing menu item coordinate information representing a display location of a menu item and image information representing an image. The reproduction apparatus includes: a reading section for reading the stream data from the recording medium; an extraction section for extracting the menu item coordinate information contained in the stream data; a reproduction section for reproducing the image information contained in the stream data; a determination section for determining whether or not the menu item has been selected by comparing the extracted menu item coordinate information against a user input in the form of coordinate information; and an execution section for executing a process corresponding to the menu item if the menu item is determined to have been selected.

In one embodiment of the invention, the user input is supplied to the reproduction apparatus via a touch panel.

In another embodiment of the invention, the user input is supplied to the reproduction apparatus via a mouse.

In another aspect of the invention, there is provided a reproduction apparatus for reproducing stream data recorded on a recording medium, the stream data containing a plurality of selectable image information units. The reproduction apparatus includes: a reading section for reading the stream data from the recording medium; a reproduction section for reproducing the stream data; a detection section for detecting a period during which the plurality of selectable image information units contained in the stream data are reproducible; an image display section for displaying images respectively representing the plurality of selectable image information units during the period; a determination section for determining which one of the images representing the plurality of selectable image information units has been selected by comparing coordinate information fed as a user input via a pointing device and display location information representing display locations of the images; and a control section for executing a process for displaying one of the images that has been determined as selected while not displaying the other images.

In one embodiment of the invention, the pointing device is a mouse.

Thus, the invention described herein makes possible the advantages of providing a reproduction apparatus which allows the selection of desired image information in an interactive manner, by directly pointing to a menu item or an "angle" on the display with a pointing device, e.g., a touch panel.

This and other advantages of the present invention will become apparent to those skilled in the art upon reading and understanding the following detailed description with reference to the accompanying figures.

DESCRIPTION OF THE PREFERRED EMBODIMENTS

EXAMPLE 1

Hereinafter, the present invention will be described by way of examples, with reference to the accompanying figures.

Figure 1:
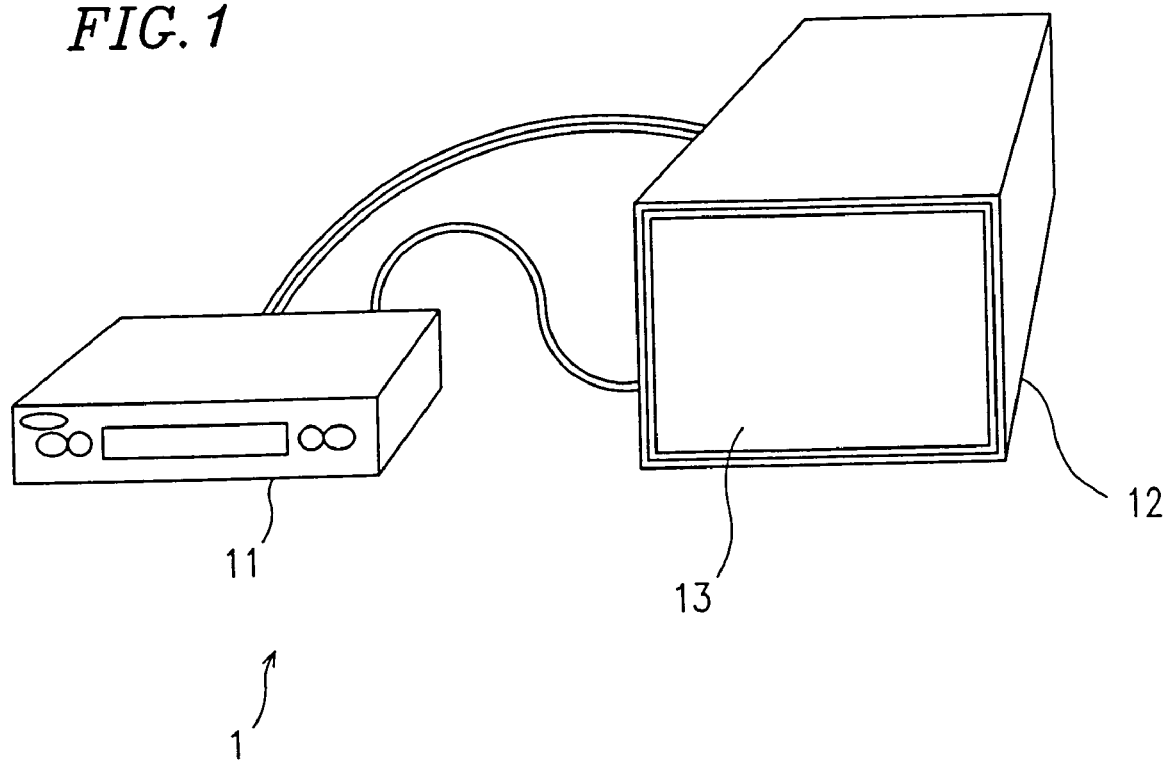
FIG. 1 is a view illustrating an optical disk reproduction system 1 according to the present invention.

FIG. 1 illustrates an optical disk reproduction system 1 according to the present invention.

The optical disk reproduction system 1 includes: an optical disk reproduction apparatus 11 for reproducing image information and/or audio information recorded on an optical disk (not shown); a display 12, e.g., a television set, for outputting image information and/or audio information reproduced by the optical disk reproduction apparatus 11; and a touch panel 13 overlaid on the screen of the display 12. The touch panel 13 functions as a position detection device for detecting a position in the displayed image on the display 12. The position information which has been detected by the touch panel 13 is input to the optical disk reproduction apparatus 11.

Figure 2:
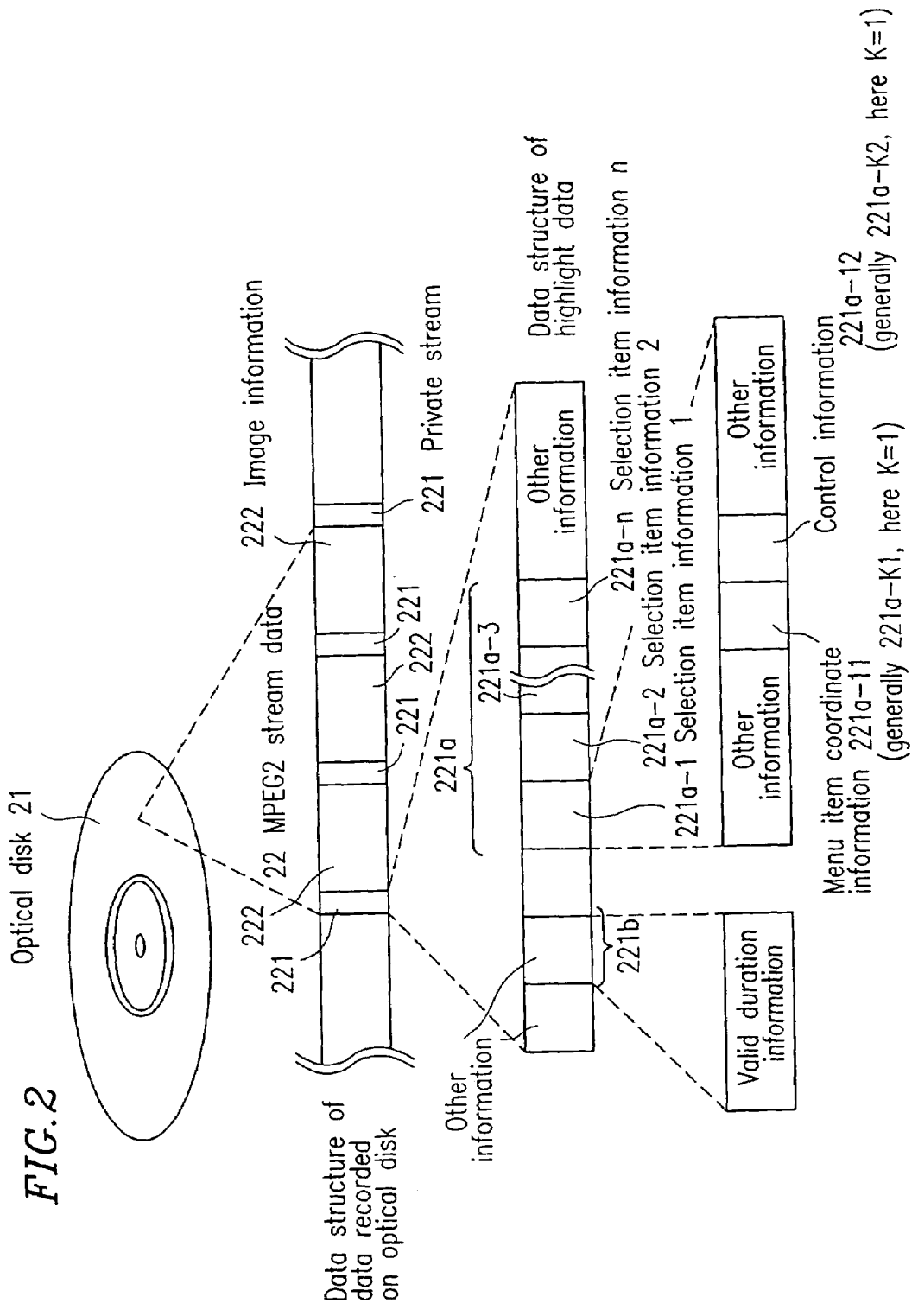
FIG. 2 is a diagram illustrating the data structure of data which is recorded on an optical disk 21 according to Example 1 of the present invention.

FIG. 2 illustrates the data structure of MPEG2 stream data 22 recorded on an optical disk 21. The MPEG2 stream data 22 is reproduced by the optical disk reproduction apparatus 11 shown in FIG. 1.

The MPEG2 stream data 22 includes at least a private stream 221 and image information 222. The private stream 221 includes highlight data 221a and valid duration information 221b. The highlight data 221a is inserted in the MPEG2 stream data 22 at predetermined time periods. The valid duration information 221b represents the duration for which the control information in the highlight data 221a is valid. The valid duration of the highlight data 221a is, by default, the period of time between the time when the highlight data is processed and the time when the next highlight data is processed.

The highlight data 221a includes selection item information 221a-1 to 221a-n (where n is an integer equal to or greater than 1). The selection item information contains information concerning an item (hereinafter referred to as "selection item") to be displayed for selection. For example, the selection item information includes data for highlighting a certain rectangular region on the display image for prompting a user to select a selection item. The selection item can be a number, a letter, or a motion picture. Each of the selection item information 221a-1 to 221a-n at least includes menu item coordinate information 221a-k1 and control information 221a-k2 (where k is an integer between 1 and n). The menu item coordinate information 221a-k1 includes coordinates representing the position of a menu item, i.e., coordinates representing a rectangular region in the display image which can be highlighted for prompting a user to select a selection item.

Although the optical disk 21 is illustrated as a recording medium in the present specification, any recording medium other than optical disks can be suitably employed.

Figure 3:
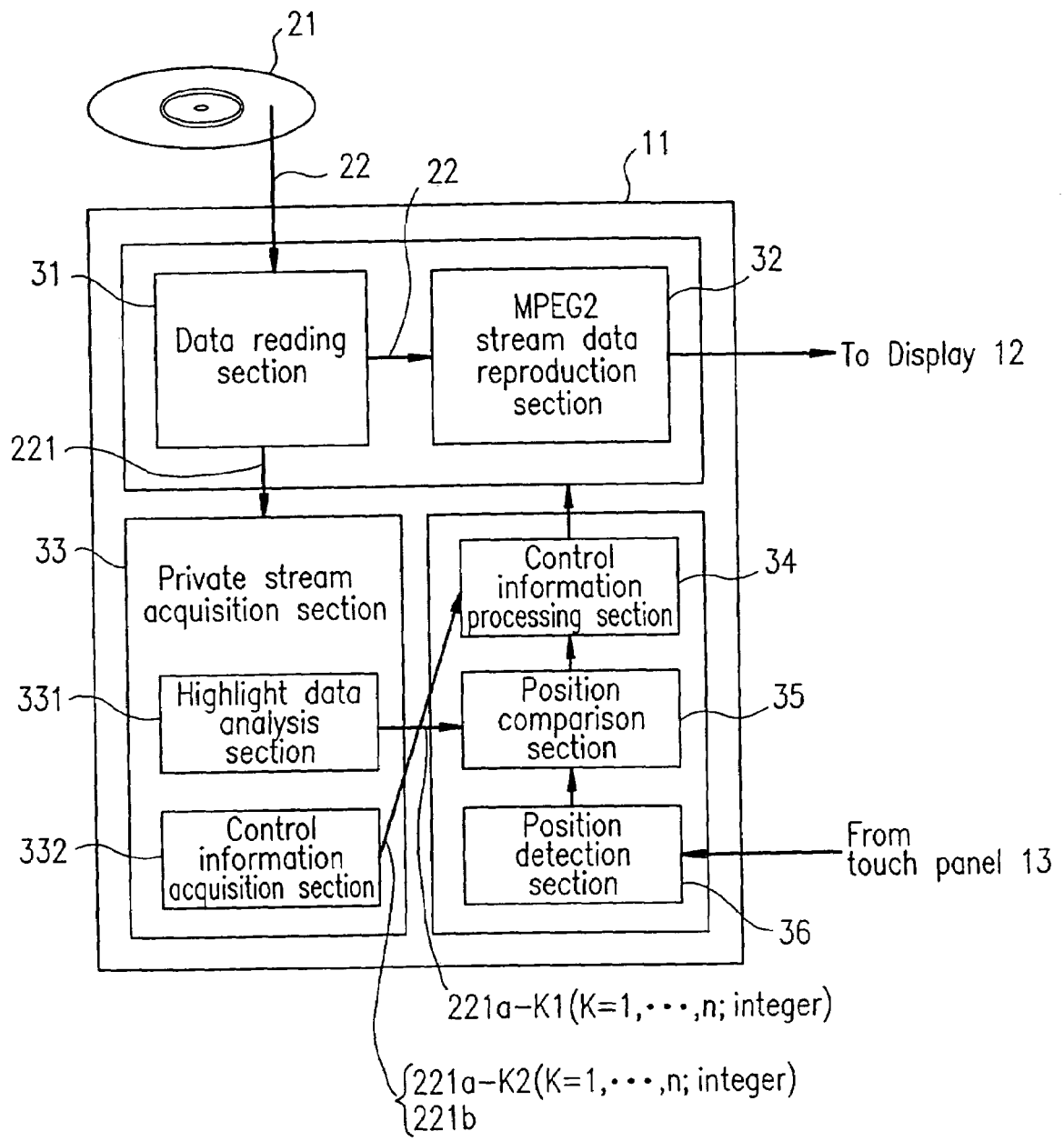
FIG. 3 is a block diagram illustrating the structure of an optical disk reproduction apparatus 11 according to Example 1 of the present invention.

FIG. 3 illustrates the structure of an optical disk reproduction apparatus 11.

The optical disk reproduction apparatus 11 includes a data reading section 31, an MPEG2 stream data reproduction section 32, a private stream acquisition section 33, a control information processing section 34, a position comparison section 35, and a position detection section 36.

The data reading section 31 reads the MPEG2 stream data 22 recorded on the optical disk 21, and outputs the MPEG2 stream data 22 which has been read to the MPEG2 stream data reproduction section 32. In addition, the data reading section 31 extracts the private stream 221 contained in the MPEG2 stream data 22 which has been read, and outputs the extracted private stream 221 to the private stream acquisition section 33.

The MPEG2 stream data reproduction section 32 receives the MPEG2 stream data 22 from the data reading section 31, and reproduces the received MPEG2 stream data 22. The MPEG2 stream data reproduction section 32 outputs the reproduced MPEG2 stream data 22 to the display 12 (FIG. 1). The display 12 (FIG. 1) displays the reproduced MPEG2 stream data 22. By reproducing the image information 222 (FIG. 2) contained in the MPEG2 stream data 22, an image is displayed on the display 12. By reproducing the selection item information 221a-k (FIG. 2), a menu item is displayed on the display 12.

The private stream acquisition section 33 obtains the private stream 221 from the data reading section 31 and extracts the menu item coordinate information 221a-k1 and control information 221a-k2, as well as the valid duration information 221b (FIG. 2) from the acquired private stream 221.

The extraction of the menu item coordinate information 221a-k1 is achieved by analyzing the highlight data 221a contained in the MPEG2 stream data 22 at a highlight data analysis section 331. The extraction of the control information 221a-k2 and the valid duration information 221b is performed by a control information acquisition section 332.

The extracted menu item coordinate information 221a-k1 is output to the position comparison section 35. The extracted control information 221a-k2 and the valid duration information 221b are output to the control information processing section 34.

The position detection section 36 detects the position which a user has input via the touch panel 13. The information of the detected position is converted into coordinate information representing coordinates on the plane of the display and output to the position comparison section 35.

The position comparison section 35 compares the coordinate information detected by the position detection section 36 and the menu item coordinate information 221a-k1 received from the highlight data analysis section 331, to determine whether or not the position indicated by the detected coordinate information is within a rectangular region specified by the menu item coordinate information. Based on the determination result, the position comparison section 35 outputs control information (corresponding to the region which has been determined to contain the position indicated by the detected coordinate information) to the control information processing section 34.

The operation of the position comparison section 35 will be described later in more detail with reference to FIG. 4.

If the position comparison section 35 determines that the position indicated by the input coordinate information is within the rectangular region specified by the menu item coordinate information, the position comparison section 35 assumes that the selection item has been pointed to and outputs a control signal to the control information processing section 34 instructing that the rectangular highlighted region should be moved to the position at which the selection item is displayed. Having received the control signal, the control information processing section 34 controls the display so that the rectangular highlighted region is moved accordingly. If a position within the rectangular highlighted region (representing a selection item) is determined to have been pointed to for a predetermined period of time or longer, the position comparison section 35 determines that the selection item has been selected. The position comparison section 35 outputs control information corresponding to the selection item to the control information processing section 34. Based on the input control information, the control information processing section 34 controls the data reading section 31 so as to reproduce motion picture information which has been selected.

The control information processing section 34 receives the control information 221a-k2 and the valid duration information 221b from the control information acquisition section 332 (included in the private stream acquisition section 33), as well as the control information from the position comparison section 35, so as to control the data reading section 31 based on the received information. Under the control of the control information processing section 34, the data reading section 31 reads the necessary MPEG2 stream data.

Figure 4:
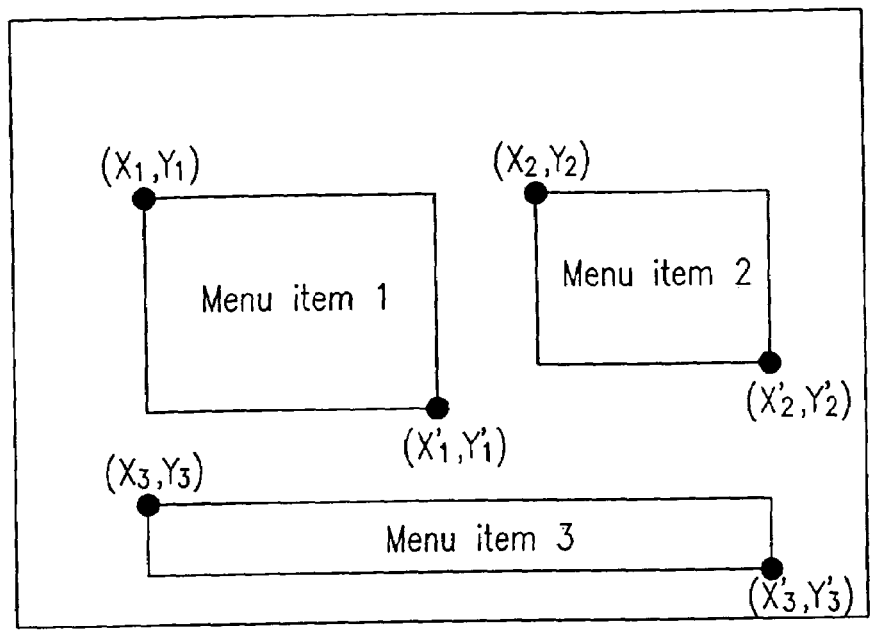
FIG. 4 is a diagram illustrating menu items available during reproduction according to Example 1 of the present invention.
Figure 5:
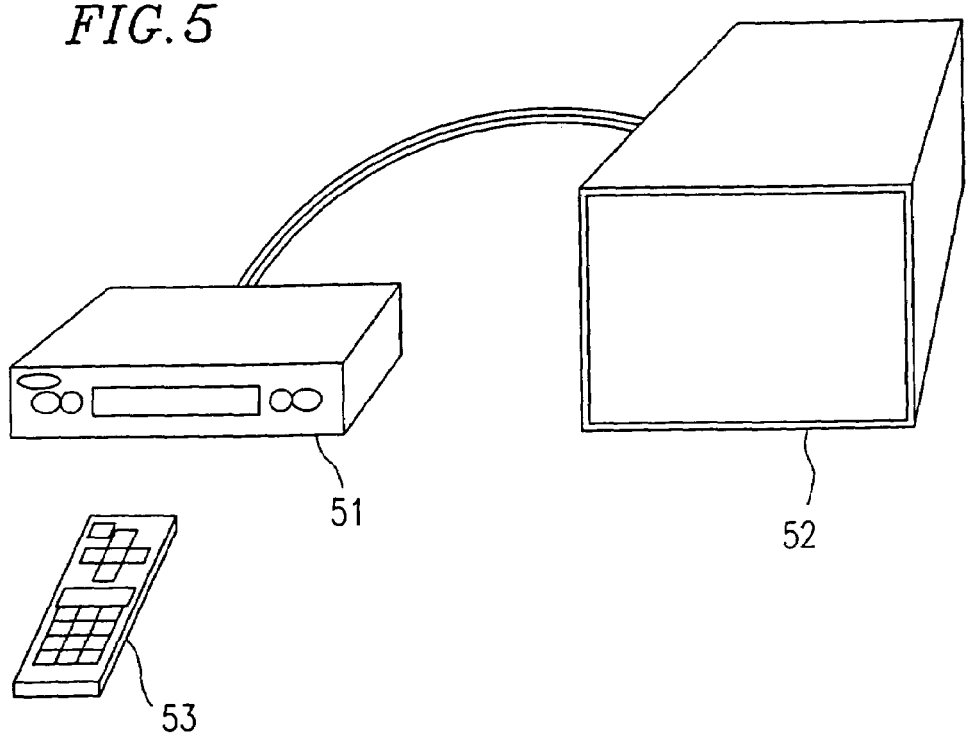
FIG. 5 is a view illustrating a conventional optical disk reproduction apparatus.

FIG. 4 illustrates an exemplary image displayed on the display 12, with three selection items (i.e., menu items 1 to 3) being displayed by reproducing the MPEG2 stream data. Although not shown in FIG. 4, a touch panel 13 (FIG. 1) is provided so as to overlay the screen of the display 12.

The menu item 1 is a rectangular region defined by two diagonal positions respectively having the coordinates ($X_1$, $Y_1$) and ($X_1'$, $Y_1'$). The coordinates ($X_1$, $Y_1$) and ($X_1'$, $Y_1'$) are represented by, for example, the menu item coordinate information 221a-11 contained in the selection item information 221a-1 shown in FIG. 2.

The menu item 2 is a rectangular region defined by two diagonal positions respectively having the coordinates ($X_2$, $Y_2$) and ($X_2'$, $Y_2'$). The coordinates ($X_2$, $Y_2$) and ($X_2'$, $Y_2'$) are represented by, for example, the menu item coordinate information 221a-21 contained in the selection item information 221a-2 shown in FIG. 2.

The menu item 3 is a rectangular region defined by two diagonal positions respectively having the coordinates ($X_3$, $Y_3$) and ($X_3'$, $Y_3'$). The coordinates ($X_3$, $Y_3$) and ($X_3'$, $Y_3'$) are represented by, for example, the menu item coordinate information 221a-31 contained in the selection item information 221a-3 shown in FIG. 2.

Although the positions of the menu items are denoted by coordinates in the present example, any other denotation method can be employed as long as the positions of the menu items can be specified. Although the menu items are illustrated as rectangular regions in the present example, the shapes of the menu items are not limited to rectangles.

Now, the method of determination by the position comparison section 35 (FIG. 3) as to whether or not a menu item has been selected will be described in more detail.

The determination as to whether the menu 1 in FIG. 4 has been selected can be made in accordance with eq. 1 below:

$$X_n > X_1 \text{ and } X_n < X_1'$$

$$Y_n > Y_1 \text{ and } Y_n < Y_1' \qquad \text{eq. 1}$$

Herein, ($X_1$, $Y_1$) and ($X_1'$, $Y_1'$) represent the coordinates of the upper left apex and the lower right apex, respectively, of the rectangular region specified by the menu item coordinate information. The coordinates ($X_n$, $Y_n$) represent the coordinate information which has been detected by the position detection section 36 (FIG. 3).

If eq. 1 is satisfied, the menu item 1 is determined to have been pointed to because the input position is within the rectangular region specified by the menu item coordinate information.

If the menu item 1 is determined to have been selected (i.e., after the menu item 1 is determined to have been pointed to for a predetermined period of time or longer), the control information corresponding to the menu item 1 is output to the control information processing section 34. Based on the input control information, the control information processing section 34 highlights a rectangular region corresponding to the menu item 1 and controls the data reading section 31 so as to reproduce the motion pictures corresponding to the menu item 1.

If eq. 1 is not satisfied, the menu item 1 is not determined to have been selected because the input position is outside the rectangular region specified by the menu item coordinate information.

Thus, the user can easily select one of a plurality of visualized menu items as described above. Therefore, the menu items do not need to be denoted with numbers and/or letters; the menu items can be, e.g., motion pictures.

As described above, in accordance with the optical disk reproduction apparatus according to Example 1 of the present invention, it is possible to control the optical disk reproduction apparatus by selecting a menu item by merely pointing to a menu item on the display so that the control information associated therewith is executed.

Although MPEG2 stream data is illustrated as the data recorded on the optical disk in the present example, the data is not limited thereto but can also be other types of motion picture stream data.

Although a touch panel is illustrated as the detection device for detecting a position on the display, any other means for detecting a position can alternatively be used. In the case where the optical disk reproduction apparatus according to the present invention is coupled to a computer, a pointing device, e.g., a mouse, or a pen tablet, can be utilized as the detection device for detecting a position on the display.

In the case where the displayed image on a computer display is enlarged or reduced, it is still possible to properly determine which position in the displayed image is pointed to because the computer can keep track of the original size of the image under reproduction in such a manner that it can calculate which position in the original image is being pointed to relative to the position which is input on the actually displayed image. The calculation result can be output to the optical disk reproduction apparatus as relative position information.

EXAMPLE 2

Hereinafter, a second example of the present invention will be described with reference to FIGS. 6, 7, 8, and 9.

Figure 9:
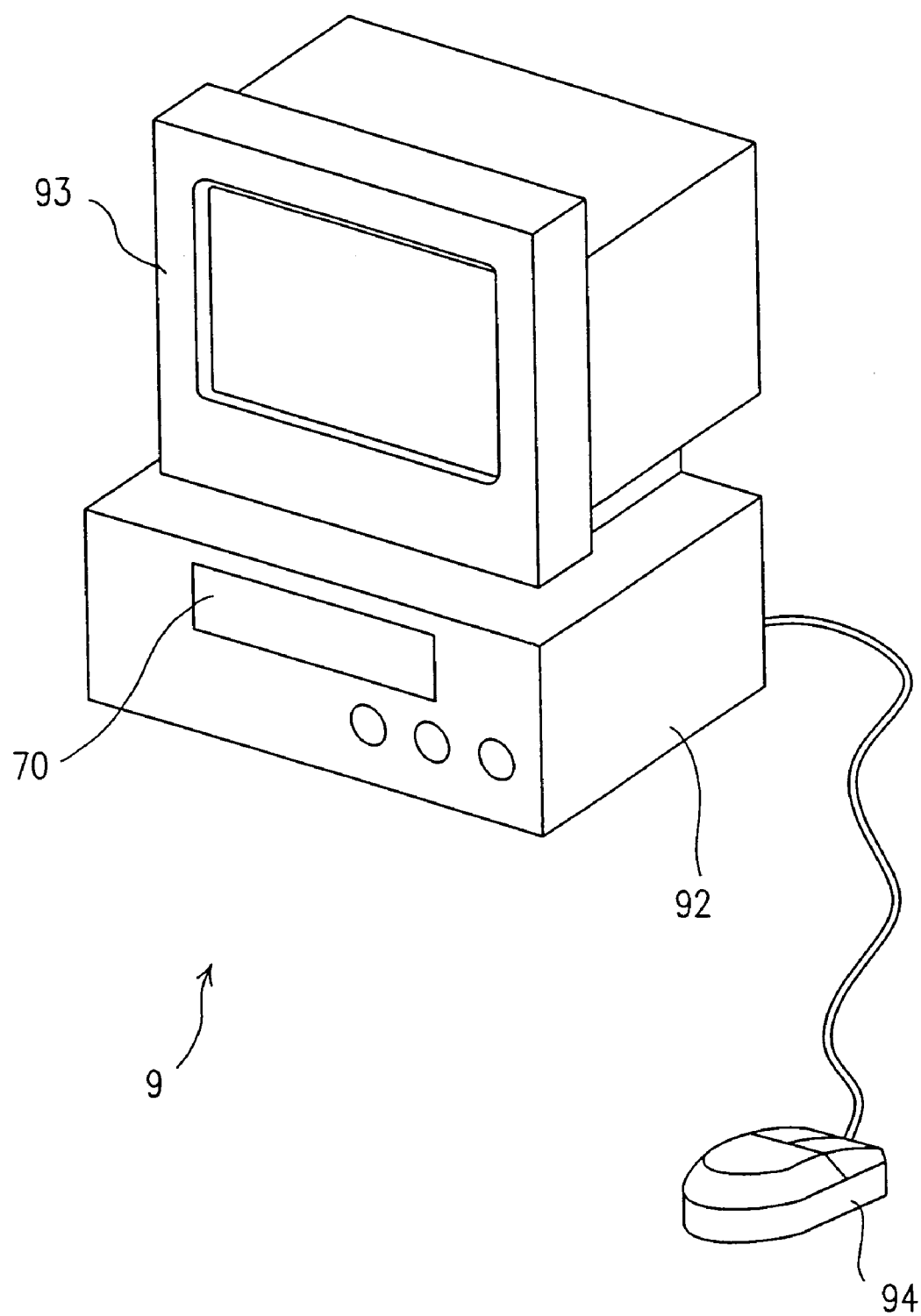
FIG. 9 is a view illustrating the structure of an optical disk reproduction system 9 according to the present invention.

FIG. 9 illustrates the structure of an optical disk reproduction system 9 according to the present invention.

The optical disk reproduction system 9 includes a computer 92, a display 93, and a mouse 94 as a detection device for detecting a position in an image which is displayed on the display 93. The computer 92 includes an optical disk reproduction apparatus 70 internalized therein.

The display 93, which is coupled to the computer 92, receives image output data from the computer 92 so as to display images. The mouse 94 is coupled to the computer 92 as a position input device. The optical disk reproduction apparatus 70 reproduces image and/or audio information recorded on an optical disk (not shown). The optical disk reproduction apparatus 70 receives the input from the mouse 94 via the computer 92, and outputs an image signal and/or an audio signal to the display 93 and/or loudspeakers (not shown).

Although the optical disk reproduction apparatus 70 is described to be internalized in the computer 92 in the present example, the optical disk reproduction apparatus 70 can alternatively be provided externally to the computer 92.

Alternatively, the computer 92 may perform some of the functions of the optical disk reproduction apparatus 70; for example, the computer 92 can reproduce the information recorded on an optical disk.

Although an optical disk is illustrated as a recording medium in the present specification, any recording medium other than optical disks can be suitably employed.

Figure 6:
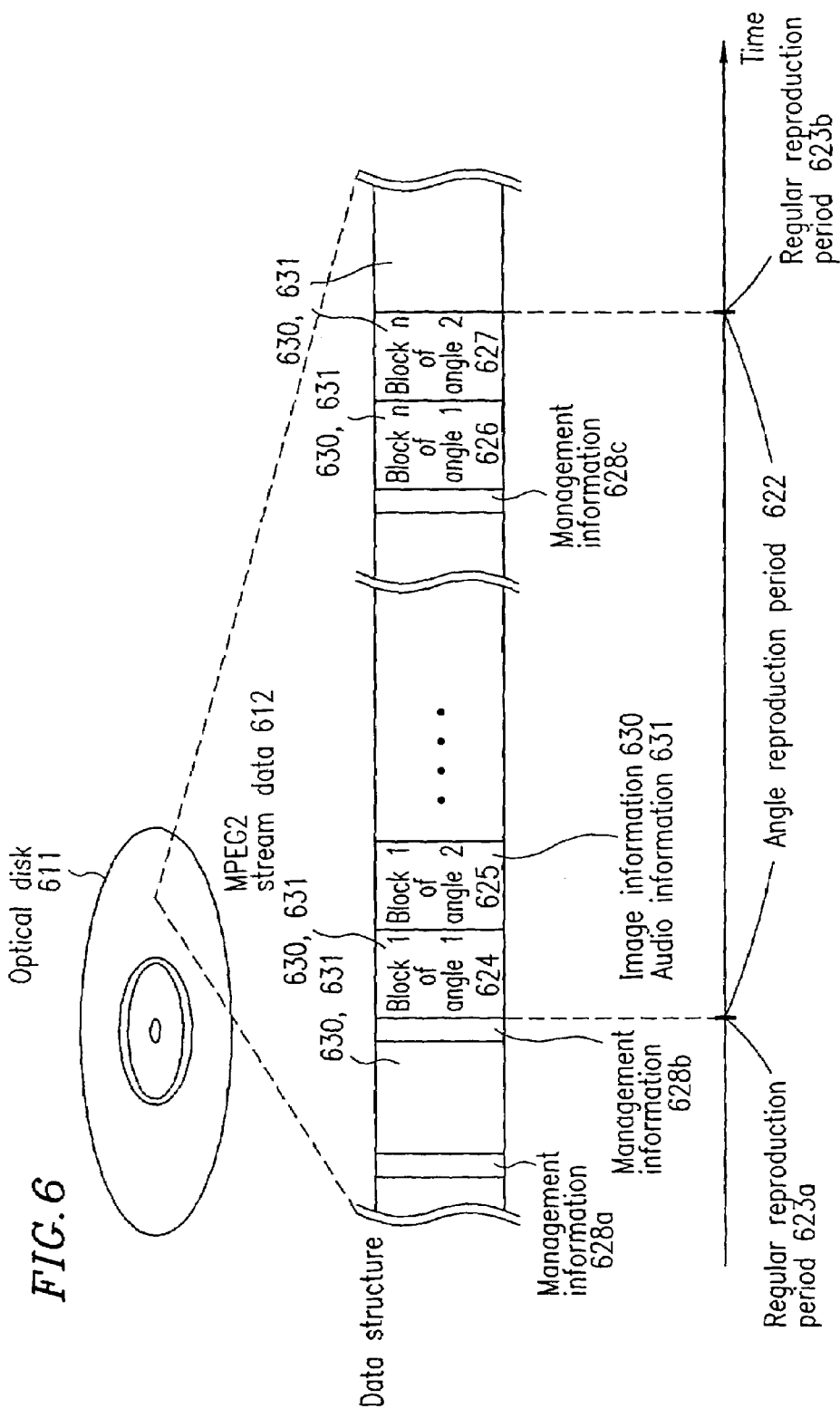
FIG. 6 is a diagram illustrating the data structure of data recorded on an optical disk 611 according to Example 2 of the present invention.

FIG. 6 illustrates the structure of MPEG2 stream data 612 recorded on an optical disk 611. The MPEG2 stream data 612 is to be reproduced by the optical disk reproduction apparatus 70 (FIG. 9).

The MPEG2 stream data 612 includes management information 628a, 628b, and 628c, image information 630, and audio information 631. The management information 628a, 628b, and 628c are recorded, at predetermined time periods, in the MPEG2 stream data 612. The image information 630 represents information concerning images, whereas the audio information 631 represents information concerning sounds.

The MPEG2 stream data 612 includes a multi-angle data structure. Herein, a "multi-angle data structure" is defined as a structure including a plurality of image data 630 and/or audio data 631 corresponding to different "angles" (as defined above) such that the image data 630 and/or audio data 631 are divided into interleaved blocks. For example, the multi-angle data structure may be a structure including block 1 of angle 1 (624), block 1 of angle 2 (625), ..., block n of angle 1 (626), and block n of angle 2 (627).

The period of time during which the MPEG2 stream data 612 is reproduced is divided into an angle reproduction period 622 (i.e., a period of time during which information contained in the multi-angle data structure is reproduced) and regular reproduction periods 623a and 623b (i.e., periods of time during which information other than that contained in the multi-angle data structure is reproduced).

During the reproduction of the MPEG2 stream data 612, the angle reproduction period 622 is detected based on the management information. For each given period, the management information includes information indicating the presence/absence of an angle period and the recorded position of each angle block. By detecting the angle reproduction period 622, it becomes possible to reproduce and display images viewed from a plurality of "angles" on the same displayed image, as described later in more detail.

Figure 7:
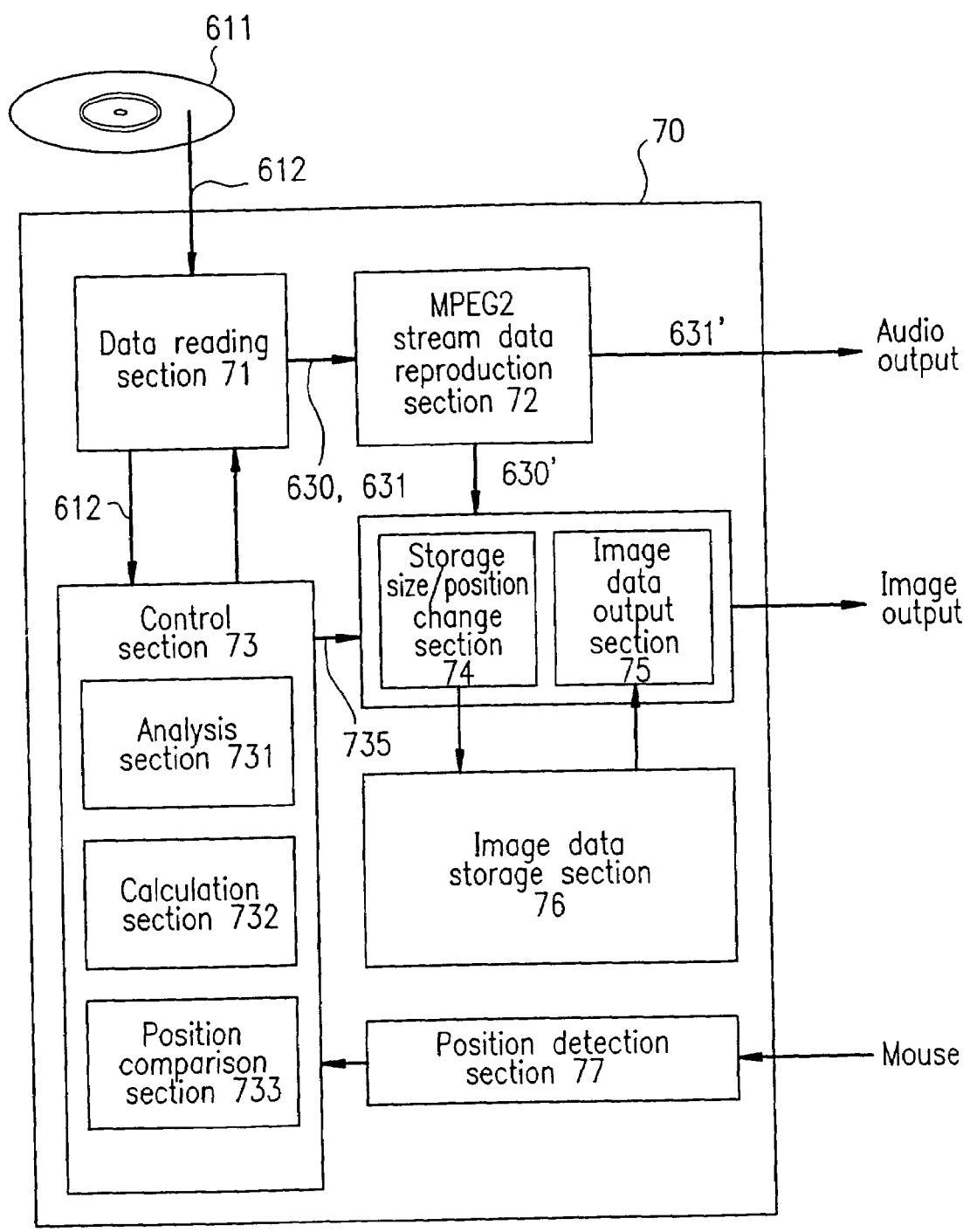
FIG. 7 is a block diagram illustrating the structure of an optical disk reproduction apparatus 70 according to Example 2 of the present invention.

FIG. 7 illustrates the structure of the optical disk reproduction apparatus 70.

The optical disk reproduction apparatus 70 includes a data reading section 71, an MPEG2 stream data reproduction section 72, a control section 73, a storage size/position change section 74, an image data output section 75, and an image data storage section 76.

The data reading section 71 reads the MPEG2 stream data 612 recorded on the optical disk 611. The data reading section 71 stores predetermined units of the MPEG2 stream data 612 which has been read in an internal memory buffer (not shown). The data reading section 71 outputs the MPEG2 stream data 612 which is stored in an internal memory buffer to the control section 73. The data reading section 71 receives the result of determination of the kind of data contained in the MPEG2 stream data 612 from the control section 73. Based on the received determination result from the control section 73, the data reading section 71 outputs the image information 630 and the audio information 631 contained in the MPEG2 stream data 612 to the MPEG2 stream data reproduction section 72, and stores the management information 628a to 628c in the memory buffer. Furthermore, the data reading section 71 receives control information from the control section 73 indicating which angle block should be read out, and reads only the blocks of the selected "angle" from the optical disk 611.

The MPEG2 stream data reproduction section 72 receives the image information 630 and the audio information 631 from the data reading section 71. The MPEG2 stream data reproduction section 72 separates the received image information 630 from the audio information 631, and reproduces the image information 630 and the audio information 631 by subjecting them to conversion processes as necessary. The MPEG2 stream data reproduction section 72 outputs the reproduced image information 630 (as image data 6301) to the storage size/position change section 74, and the reproduced audio information 631 (as audio output data 631') to the exterior of the optical disk reproduction apparatus 70.

The control section 73 receives the MPEG2 stream data 612 from the data reading section 71. An analysis section 731 analyzes the MPEG2 stream data 612 in order to determine whether the analyzed data is the image information 630, the audio information 631, or the management information 628a to 628c, following a method according to the MPEG2 specification. The control section 73 outputs the determination result to the data reading section 71.

If an angle reproduction period 622 (FIG. 6) is reached during the reproduction of the MPEG2 stream data 612, the analysis section 731 of the control section 73 detects that the currently-reproduced period is an angle reproduction period, based on the determination of the management information stored in the internal memory buffer. If the currently-reproduced period is thus determined as an angle reproduction period, the analysis section 731 further analyzes the management information 628a to 628c stored in the internal memory buffer. The calculation section 732 calculates the number of subsections (i.e., angles) into which the displayed image is to be divided (in accordance with the number of interleaved "angles"), as well as the reduction rate for each "angle" image. For example, if the number of "angles" is four, then the displayed image is to be divided into four subsections, requiring a reduction rate of ¼. Once the number of subsections of the displayed image and the reduction rate are thus determined, the control section 73 outputs a stored information signal 735 (containing the number of subsections of the displayed image and the reduction rate) to the storage size/position change section 74. The output of the stored information signal 735 is made based on the angle number of the angle block under reproduction.

The position information indicating a position on the display pointed to by the user with a mouse is detected by the position detection section 77 and the detected position information is converted into coordinate information representing coordinates on the plane of the display and output to the position comparison section 733. The position comparison section 733 determines which "angle" is being displayed at the position indicated by the position information which has been detected by the position detection section 77. As a result of the determination, the control section 73 controls the data reading section 71 so as to read only the angle block which is displayed at the position indicated by the position information.

The storage size/position change section 74 receives from the MPEG2 stream data reproduction section 72 the image information 630 (as image data 630') that has been subjected to necessary conversion processes, and receives the stored information signal 735 from the control section 73. Based on the reduction rate contained in the stored information signal 735, the storage size/position change section 74 reduces the size of the image data 630' received from the MPEG2 stream reproduction section 72. Furthermore, based on the number of subsections of the displayed image and the angle number contained in the stored information signal 735, the storage size/position change section 74 determines which position (hereinafter referred to as the "storage position") on the display the image data 630' is to be displayed, prior to storage in the image data storage section 76. The image data 630' is stored angle by angle. The storage position is preferably determined so as not to overlap with the displayed image of the image data 630' that has been previously stored; alternatively, the storage position may overlap with the displayed image of the previously-stored image data 630'.

After the size of the image data 630' is reduced and its storage position is determined, the storage size/position change section 74 outputs the image data 630' to the image data storage section 76.

The image data storage section 76 receives the image data 630' from the storage size/position change section 74 and stores the received image data 630'. The image data storage section 76 outputs the received image data 630' to the image data output section 75.

Upon receiving the image data 630' from the image data storage section 76, the image data output section 75 converts the image data 630' into, for example, a signal conforming to the NTSC (National Television System Committee) standard (number of scanning lines: 525; frame frequency: 30 Hz; image signal band: 4.2 MHz; horizontal synchronization frequency: 15.750 kHz), which is output to the exterior of the optical disk reproduction apparatus 70.

Figure 8:
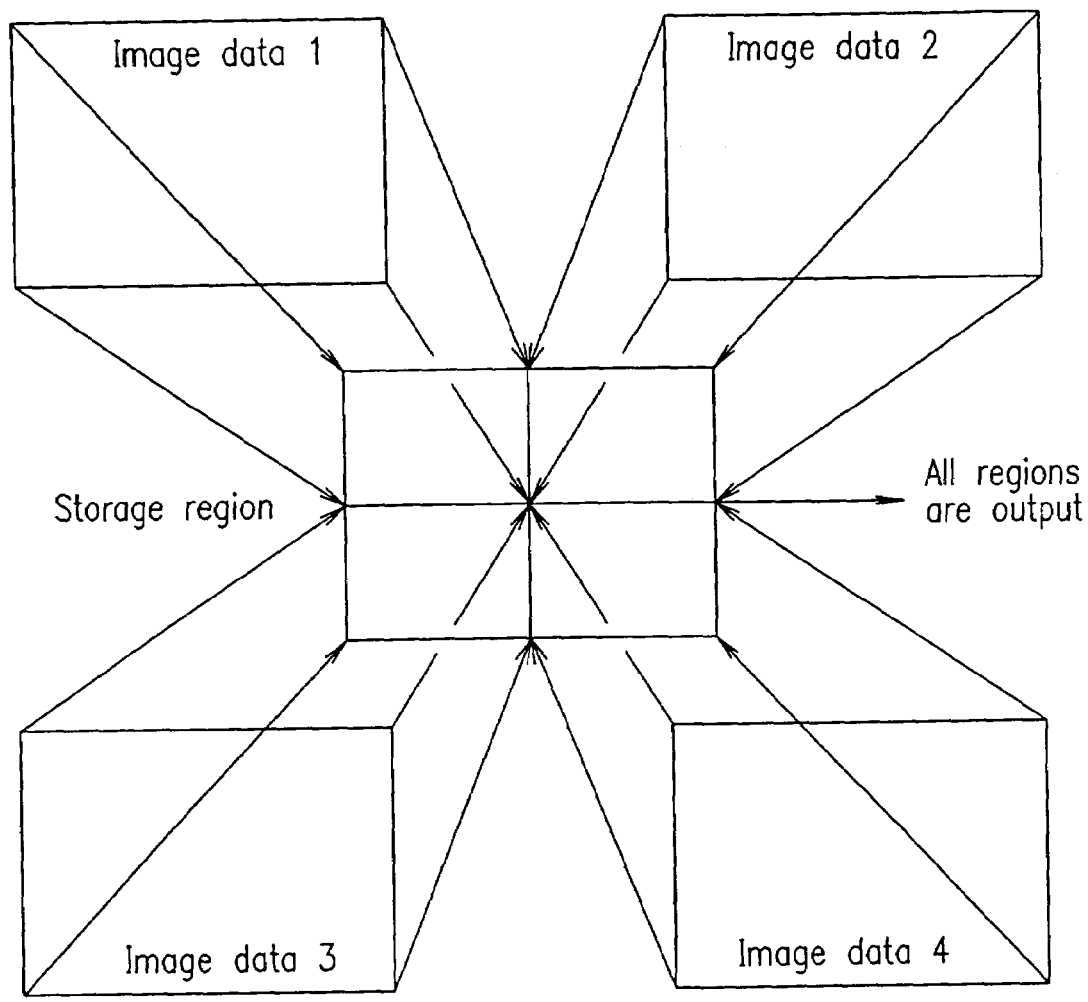
FIG. 8 is a diagram illustrating exemplary reproduced image data according to Example 2 of the present invention.

For example, in the aforementioned case where the number of subsections of the displayed image is four, the respective image data of the subsections are stored for output at the positions shown in FIG. 8. In FIG. 8, the image data corresponding to angle number 1 is denoted as image data 1; the image data corresponding to angle number 2 is denoted as image data 2; the image data corresponding to angle number 3 is denoted as image data 3; and the image data corresponding to angle number 4 is denoted as image data 4.

The image data corresponding to the respective "angles" are displayed to be utilized as index images for the respective "angles". Herein, an "index image" is defined as an image representing the image information contained in each angle block. When the storage of the interleaved image data corresponding to all the "angles" (i.e., four angles in this exemplary case) is complete, the index images are updated in accordance with the image data of "angles" which will be read in the subsequent cycle of "angles". When updating the index images, the image data output section 75 reads and outputs the image data of all storage regions in the image data storage section 76. As a result, the user can visually recognize that the angle reproduction period 622 in the MPEG2 stream data 612 is being reproduced, and further visually recognize which "angles" are available in this angle reproduction period 622.

During the above-described index image displaying process, the user can determine the "angle" which the user desires to reproduce and designate a position where that "angle" is being displayed by using the mouse 94 (FIG. 9). Upon the designation made by the user, the control section 73 terminates the index image displaying process and controls the data reading section 71 so as to read only the selected "angle" (similarly to the case of reproducing a single image). Thereafter, the selected "angle" is displayed on the display 93 (FIG. 9).

The determination as to which "angle" has been selected is made in a position comparison section 733 (FIG. 7) in a similar manner to the determination illustrated in Example 1 concerning whether a menu item has been selected or not, i.e., based on a coordinate denotation of a position in the displayed image that has been input by the user via the mouse 94 (FIG. 9), and on a coordinate denotation of the positions of regions displaying the respective "angles" as calculated based on the number of subsections of the displayed image and the reduction rate. Thus, it can be determined which "angle" is being displayed at the position that has been input by the user via the mouse 94.

Thus, an optical disk reproduction apparatus has been described which allows the selection of desired image information in an interactive manner, by directly pointing to one of a plurality of "angles" with a mouse coupled to a computer.

Although the selection of "angles" reproduced in the index image displaying process in the present example is described as being achieved by using a mouse to designate an angle position to be selected, the device for designating an angle position is not limited to a mouse. Alternatively, a pointing device such as a touch panel or a pen tablet as described in Example 1 can be used, for example. The user can select an "angle" in an interactive manner, the selection being known through comparison between a position on the display designated with such a pointing device and the positions of the index images.

Alternatively, the selection of the "angle" reproduced in the index image displaying process can be made by designating the number of the desired "angle" with a remote controller or the like.

In the case where the displayed image on a computer display is enlarged or reduced, it is still possible to properly determine which position in the displayed image is pointed to because the computer can keep track of the original size of the image under reproduction in such a manner that it can calculate which position in the original image is being pointed to relative to the position which is input on the actually displayed image. The calculation result can be output to the optical disk reproduction apparatus as relative position information.

Although the present example employs a MPEG2 stream (referred to as a program stream) in such a manner that a motion picture elementary stream is divided into "angles" during an angle reproduction period, it is also applicable to employ a so-called transport stream, i.e., a multistream composed of a plurality of MPEG streams in such a manner that the images of different "angles" are contained in respectively different streams.

Although the information for identifying angle reproduction periods during reproduction of the MPEG2 stream data in the present example is described to be contained in the control information, which is interleaved in the MPEG2 stream data at predetermined periods, the information for identification can be contained in a region different from the region in which the MPEG2 stream data is contained. In this case, the optical disk reproduction apparatus can begin the reproduction of MPEG2 stream data after reading the information for identification and storing it in an internal memory at the beginning of the reproduction.

As described above, according to the present invention, the user can select from menu items or "angles" by directly pointing to a desired menu item or "angle" on the display by using a pointing device.

Since the user selects a menu item by directly designating a menu item on the display, the menu does not need to contain numbers or letters, thereby providing for more liberty in the creation of contents.

Furthermore, the user can control the display image by choosing an image on the display without necessarily comprehending, if at all, any numbers or letters.

In a multiple image mode, all the interleaved "angles" recorded on the optical disk can be reproduced and simultaneously displayed as index images composing one display image. A user can confirm the content of the "angles" based on the index images and visually select a desired "angle" without difficulty.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A machine readable recording medium on which transport stream data has been recorded, the transport stream data comprising menu item coordinate information, image information and valid duration information, such that when read by the machine carries out a process of:
   representing a display location of a menu item using the menu item coordinate information;
   representing an image using the image information; and
   representing the duration for which the menu item coordinate information is valid using the valid duration information, including:
      reading the menu item coordinate information and valid duration information inserted in the transport stream data at predetermined time periods; and
      associating a particular data of multi-angle data included in the transport stream data with a particular menu item
   whereby while representing the image on the display, menu items corresponding to the particular multi-angle data are presentable on the display at corresponding display locations based on the menu item coordinate information during such time as the menu item coordinate information is valid as determined by the valid duration information.

* * * * *